(12) United States Patent
Gurvich et al.

(10) Patent No.: US 11,398,214 B2
(45) Date of Patent: Jul. 26, 2022

(54) FORMING A STRUCTURED PANEL WITH ONE OR MORE STRUCTURAL REINFORCEMENTS

(71) Applicant: Rohr, Inc., Chula Vista, CA (US)

(72) Inventors: Mark R. Gurvich, Middletown, CT (US); Georgios S. Zafiris, Glastonbury, CT (US); Jeffrey A. Anderson, San Diego, CA (US); Jose S. Alonso-Miralles, Chula Vista, CA (US); Milan Mitrovic, Del Mar, CA (US); Terry Muy, Chula Vista, CA (US); George Hoehn, Oceanside, CA (US); Timothy Olson, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 577 days.

(21) Appl. No.: 16/382,450

(22) Filed: Apr. 12, 2019

(65) Prior Publication Data
US 2020/0193953 A1 Jun. 18, 2020

Related U.S. Application Data

(60) Provisional application No. 62/766,606, filed on Dec. 14, 2018.

(51) Int. Cl.
 *G10K 11/172* (2006.01)
 *B64D 33/02* (2006.01)
 *F02C 7/045* (2006.01)
(52) U.S. Cl.
 CPC ............ *G10K 11/172* (2013.01); *B64D 33/02* (2013.01); *B64D 2033/0206* (2013.01); *F02C 7/045* (2013.01)
(58) Field of Classification Search
 CPC .................. G10K 11/172; B64D 33/02; B64D 2033/0206; F02C 7/045
 (Continued)

(56) References Cited

U.S. PATENT DOCUMENTS 2,333,343 A   11/1943   Sendzimir
3,011,602 A   12/1961   Ensrud et al.
(Continued)

FOREIGN PATENT DOCUMENTS

CN    101649818    7/2011
CN    104723616    6/2015
(Continued)

OTHER PUBLICATIONS

EP search report for EP19166905.0 dated Sep. 16, 2019.
EP search report for EP19216015.8 dated May 26, 2020.
EP search report for EP19216189.1 dated May 26, 2020.

*Primary Examiner* — Forrest M Phillips
(74) *Attorney, Agent, or Firm* — Getz Balich LLC

(57) ABSTRACT

A method is provided for forming a structured panel. During this method, a cellular core is formed that comprises a corrugated ribbon configured with a plurality of baffles and a plurality of septums. Each of the septums extends longitudinally between and connected to a respective adjacent pair of the baffles. At least one element of the corrugated ribbon includes a structural reinforcement. The forming includes: feeding a ribbon of material between a first roller and a second roller, corrugating the ribbon of material with the first roller and the second roller to provide the baffles and the septums, and stamping the structural reinforcement into the element with the first roller and the second roller. The cellular core is bonded to a first skin. The cellular core is bonded to a second skin. The cellular core is vertically between the first skin and the second skin, and the first skin is configured with a plurality of perforations.

20 Claims, 14 Drawing Sheets

(58) Field of Classification Search
USPC .......................................................... 181/175
See application file for complete search history.

(56) References Cited

U.S. PATENT DOCUMENTS

| | | | |
|---|---|---|---|
| 3,341,395 A | 9/1967 | Weber | |
| 3,380,206 A | 4/1968 | Barnett | |
| 3,439,774 A | 4/1969 | Callaway | |
| 3,507,355 A | 4/1970 | Lawson | |
| 3,542,152 A | 11/1970 | Adamson et al. | |
| 3,639,106 A | 2/1972 | Yate | |
| 3,640,357 A | 2/1972 | Kitching et al. | |
| 3,734,234 A | 5/1973 | Wirt | |
| 3,819,007 A | 6/1974 | Wirt et al. | |
| 3,821,999 A | 7/1974 | Guess et al. | |
| 3,831,710 A | 8/1974 | Wirt | |
| 3,848,697 A | 11/1974 | Jannot et al. | |
| 3,850,261 A | 11/1974 | Hehmann et al. | |
| 3,910,374 A | 10/1975 | Holehouse | |
| 3,948,346 A | 4/1976 | Schindler | |
| 3,969,563 A | 7/1976 | Hollis, Sr. | |
| 4,189,027 A | 2/1980 | Dean, III et al. | |
| 4,240,519 A | 12/1980 | Wynosky | |
| 4,859,517 A | 8/1989 | Hull | |
| 5,431,980 A | 7/1995 | McCarthy | |
| 5,498,462 A * | 3/1996 | Darfler | B29C 70/08 428/116 |
| 5,543,204 A * | 8/1996 | Ray | B32B 3/28 428/179 |
| 5,634,306 A | 6/1997 | Riegelman | |
| 5,923,003 A | 7/1999 | Arcas et al. | |
| 5,997,985 A | 12/1999 | Clarke et al. | |
| 6,274,216 B1 * | 8/2001 | Gonidec | B32B 3/12 428/116 |
| 6,598,701 B1 | 7/2003 | Wood et al. | |
| 6,725,541 B1 | 4/2004 | Holme et al. | |
| 6,871,725 B2 | 3/2005 | Johnson | |
| 6,949,282 B2 | 9/2005 | Obeshaw | |
| 7,124,856 B2 | 10/2006 | Kempton et al. | |
| 7,784,283 B2 | 8/2010 | Yu et al. | |
| 7,814,658 B2 | 10/2010 | Akishev et al. | |
| 7,878,229 B2 | 2/2011 | Nakajima et al. | |
| 7,959,109 B2 | 6/2011 | Dasilva et al. | |
| 7,963,362 B2 | 6/2011 | Lidoine | |
| 7,971,684 B2 | 7/2011 | Ganite et al. | |
| 8,025,122 B2 | 9/2011 | Gilcreest et al. | |
| 8,245,815 B2 | 8/2012 | Valleroy et al. | |
| 8,336,316 B2 | 12/2012 | Kirby | |
| 8,413,922 B2 | 4/2013 | Porte et al. | |
| 8,449,707 B2 | 5/2013 | Simmons et al. | |
| 8,517,309 B2 | 8/2013 | Robinson | |
| 8,544,598 B2 | 10/2013 | Gaudry et al. | |
| 8,646,574 B2 | 2/2014 | Drevon et al. | |
| 8,684,301 B2 | 4/2014 | Porte et al. | |
| 8,733,501 B2 | 5/2014 | Porte et al. | |
| 8,763,751 B2 | 7/2014 | Starobinski et al. | |
| 8,776,946 B2 | 7/2014 | Todorovic | |
| 8,820,477 B1 | 9/2014 | Herrera et al. | |
| 8,955,643 B2 | 2/2015 | Liu | |
| 9,403,340 B2 * | 8/2016 | Zafiris | B29D 99/0021 |
| 9,486,975 B2 * | 11/2016 | Franzoi | F02C 7/045 |
| 9,620,102 B1 * | 4/2017 | Ichihashi | B64D 33/02 |
| 9,643,378 B2 * | 5/2017 | Ho | B32B 13/06 |
| 9,704,467 B1 * | 7/2017 | Nampy | G10K 11/172 |
| 9,761,216 B2 * | 9/2017 | Nampy | G10K 11/168 |
| 10,316,755 B2 * | 6/2019 | Biset | F02C 7/24 |
| 2011/0100747 A1 | 5/2011 | Hoetzeldt et al. | |
| 2013/0266772 A1 | 10/2013 | Fujii | |
| 2014/0034416 A1 | 2/2014 | Liu | |
| 2014/0120317 A1 * | 5/2014 | Zafiris | B29C 70/086 428/160 |
| 2014/0349082 A1 | 11/2014 | Tien | |
| 2015/0110603 A1 | 4/2015 | Biset et al. | |
| 2015/0284945 A1 | 10/2015 | Tien | |
| 2015/0367953 A1 | 12/2015 | Yu et al. | |
| 2016/0312709 A1 | 10/2016 | Nampy | |
| 2017/0225764 A1 | 8/2017 | Nampy et al. | |
| 2017/0229106 A1 | 8/2017 | Nampy | |
| 2017/0301334 A1 | 10/2017 | Nampy | |
| 2018/0142621 A1 | 5/2018 | Biset | |
| 2018/0229829 A1 | 8/2018 | Pierick et al. | |

FOREIGN PATENT DOCUMENTS

| | | |
|---|---|---|
| FR | 2201010 | 4/1974 |
| GB | 1406844 | 9/1975 |
| RU | 2413654 | 6/2010 |

\* cited by examiner

FORMING A STRUCTURED PANEL WITH ONE OR MORE STRUCTURAL REINFORCEMENTS

This application claims priority to U.S. patent application No. 62/766,606 filed Dec. 14, 2018, which is hereby incorporated herein by reference in its entirety.

BACKGROUND

1. Technical Field

This disclosure relates generally to structured panels and, more particularly for example, to a structured panel that attenuates sound generated by a gas turbine engine for an aircraft propulsion system and methods for forming such a structured panel.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers for attenuating higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for such relatively low frequency noise. Reducing the thickness of the acoustic panel also has the concern of compromising structural integrity.

There is a need in the art for acoustic and structural panels with increased structural integrity and reduced thicknesses and methods for forming such panels.

SUMMARY OF THE DISCLOSURE

According to an aspect of the present disclosure, a method is provided for forming a structured panel. This method includes: (A) forming a cellular core that comprises a corrugated ribbon configured with a plurality of baffles and a plurality of septums, each of the septums extending longitudinally between and connected to a respective adjacent pair of the baffles, at least one element of the corrugated ribbon comprising a structural reinforcement; (B) bonding the cellular core to a first skin; and (C) bonding the cellular core to a second skin. The forming includes: (i) feeding a ribbon of material between a first roller and a second roller, (ii) corrugating the ribbon of material with the first roller and the second roller to provide the baffles and the septums, and (iii) stamping the structural reinforcement into the element with the first roller and the second roller. The cellular core is vertically between the first skin and the second skin, and the first skin is configured with a plurality of perforations.

According to another aspect of the present disclosure, a formation method is provided that includes forming a corrugated ribbon comprising a plurality of baffles and a plurality of septums. Each of the septums extends longitudinally between and connected to a respective adjacent pair of the baffles. At least one element of the corrugated ribbon includes a structural reinforcement. The forming includes: (i) feeding a ribbon of polymer material between a first roller and a second roller, (ii) corrugating the ribbon of polymer material with the first roller and the second roller to provide the baffles and the septums, and (iii) stamping the structural reinforcement into the element with the first roller and the second roller. The element is configured as or otherwise includes one of the baffles or one of the septums.

According to an aspect of the present disclosure, a method is provided for forming a structured panel. This method includes: (A) forming a cellular core comprising a corrugated ribbon, a first wall and a second wall, the corrugated ribbon laterally between the first wall and the second wall, the corrugated ribbon including a plurality of baffles and a plurality of porous septums, each of the porous septums longitudinally between a respective adjacent pair of the baffles, and at least one element of the cellular core configured with a structural reinforcement comprising a rib; (B) bonding the cellular core to a first skin; and (C) bonding the cellular core to a second skin. The forming includes: (i) feeding a ribbon of polymer material between a first roller and a second roller, and (ii) stamping the structural reinforcement into the element with the first roller and the second roller. The cellular core is vertically between the first skin and the second skin. The first skin is configured with a plurality of perforations.

The first roller may include a plurality of first teeth arranged in a first array. The second roller may include a plurality of second teeth arranged in a second array. The first teeth may be configured to mesh with the second teeth to corrugate the ribbon of material.

At least one of the first teeth may include a female die portion. At least one of the second teeth may include a male die portion. The stamping may include mating the male die portion with the female die portion to stamp the structural reinforcement into the element.

The at least one of the first teeth may also include a second female die portion. The at least one of the second teeth may also include a second male die portion. The forming may also include stamping a second structural reinforcement into the element by mating the second male die portion with the second female die portion.

The at least one of the first teeth may also include a second male die portion. The at least one of the second teeth may also include a second female die portion. The forming may also include stamping a second structural reinforcement into the element by mating the second male die portion with the second female die portion.

During the method, the first roller and/or the second roller may be heated during the corrugating and the stamping.

The element may include a base. The structural reinforcement may project out from the base.

The structural reinforcement may be configured as or otherwise include a rib.

The structural reinforcement may include a first rib and a second rib that intersects with the first rib.

The element may be configured as or otherwise include one of the baffles.

The element may be configured as or otherwise include one of the septums.

The cellular core may include a first wall and a second wall. The corrugated ribbon may be laterally between and bonded to the first wall and the second wall.

The corrugated ribbon may be configured from or otherwise include thermoplastic polymer material.

The corrugated ribbon may be configured from or otherwise include thermoset polymer material.

The structured panel may be configured as or otherwise include an acoustic panel configured to attenuate noise.

The first roller may include a plurality of first projections. The second roller may include a plurality of second projections configured to mesh with the second projections to corrugate the ribbon of material.

At least one of the first projections may include a female die portion. At least one of the second projections may include a male die portion configured to mate the female die portion to stamp the structural reinforcement into the element.

The forming may also include corrugating the ribbon of polymer material with the first roller and the second roller to provide the baffles and the porous septums.

The foregoing features and the operation of the invention will become more apparent in light of the following description and the accompanying drawings.

DETAILED DESCRIPTION

The present disclosure includes structured panels and methods for forming structured panels and their components. An example of a structured panel is an acoustic panel for attenuating sound; e.g., noise. Such a structured panel may include one or more structural reinforcements, such as rib structures, for increasing rigidity, strength, stability (i.e., resistance to buckling) and/or other metrics of structural integrity of the panel. For ease of description, the following disclosure will first describe a general panel configuration without structural reinforcements and then describe how one or more structural reinforcements may be added to one or more elements (e.g., components) of the panel to increase rigidity, strength, stability and/or other metrics of structural integrity of that panel.

Figure 1:
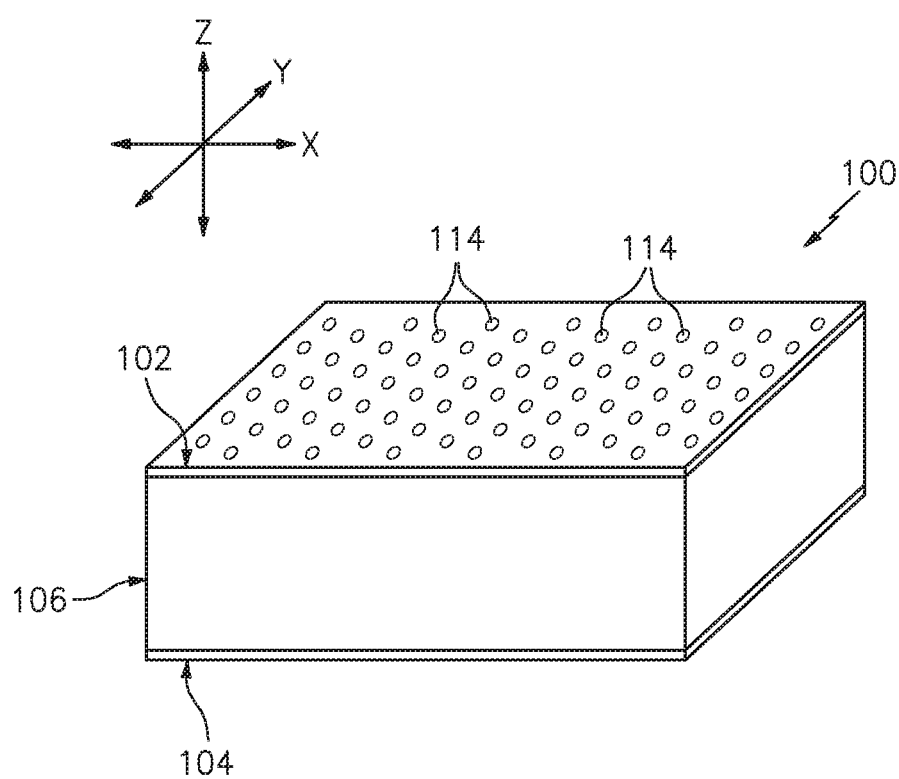
FIG. 1 is a partial, perspective schematic illustration of an acoustic panel, in accordance with various embodiments.

FIG. 1 is a partial, perspective schematic illustration of an acoustic panel 100 for attenuating noise. This acoustic panel 100 may be configured to attenuate noise generated by an aircraft propulsion system such as, for example, a turbofan propulsion system or a turbojet propulsion system. With such a configuration, the acoustic panel 100 may be configured with a nacelle of the propulsion system. The acoustic panel 100, for example, may be configured as or with an inner or outer barrel, a translating sleeve of a thrust reverser, a blocker door, etc. Alternatively, the acoustic panel 100 may be configured with another component/structure of the aircraft such as its fuselage or a wing. Furthermore, the acoustic panel 100 may be configured to also or alternatively attenuate aircraft related noise other than that generated by the propulsion system. The acoustic panel 100 of the present disclosure, however, may alternatively be configured for non-aircraft applications.

The acoustic panel 100 extends longitudinally along an x-axis. The acoustic panel 100 extends laterally along a y-axis. The acoustic panel 100 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 100 may be curved and/or follow an undulating geometry. For example, the x-y plane and, thus, the acoustic panel 100 may be arcuate, cylindrical or conical with or without radial undulations. Thus, the vertical direction may change at different locations along the x-y plane; e.g., the vertical direction may be a radial direction for a cylindrical or conical acoustic panel.

The acoustic panel 100 includes a perforated first (e.g., face) skin 102, a solid non-perforated second (e.g., back)

skin 104 and a cellular core 106. Briefly, the cellular core 106 is disposed and extends vertically between the first skin 102 and the second skin 104. The cellular core 106 is also connected to the first skin 102 and the second skin 104. The cellular core 106, for example, may be fused, adhered, welded, brazed and/or otherwise bonded to the first skin 102 and/or the second skin 104. The cellular core 106 may also or alternatively be mechanically fastened to the first skin 102 and/or the second skin 104. Alternatively, the cellular core 106 may be formed integral with the first skin 102 and/or the second skin 104 as a monolithic body using, for example, additive manufacturing. However, the present disclosure is not limited to any particular manufacturing methods.

Figure 2:
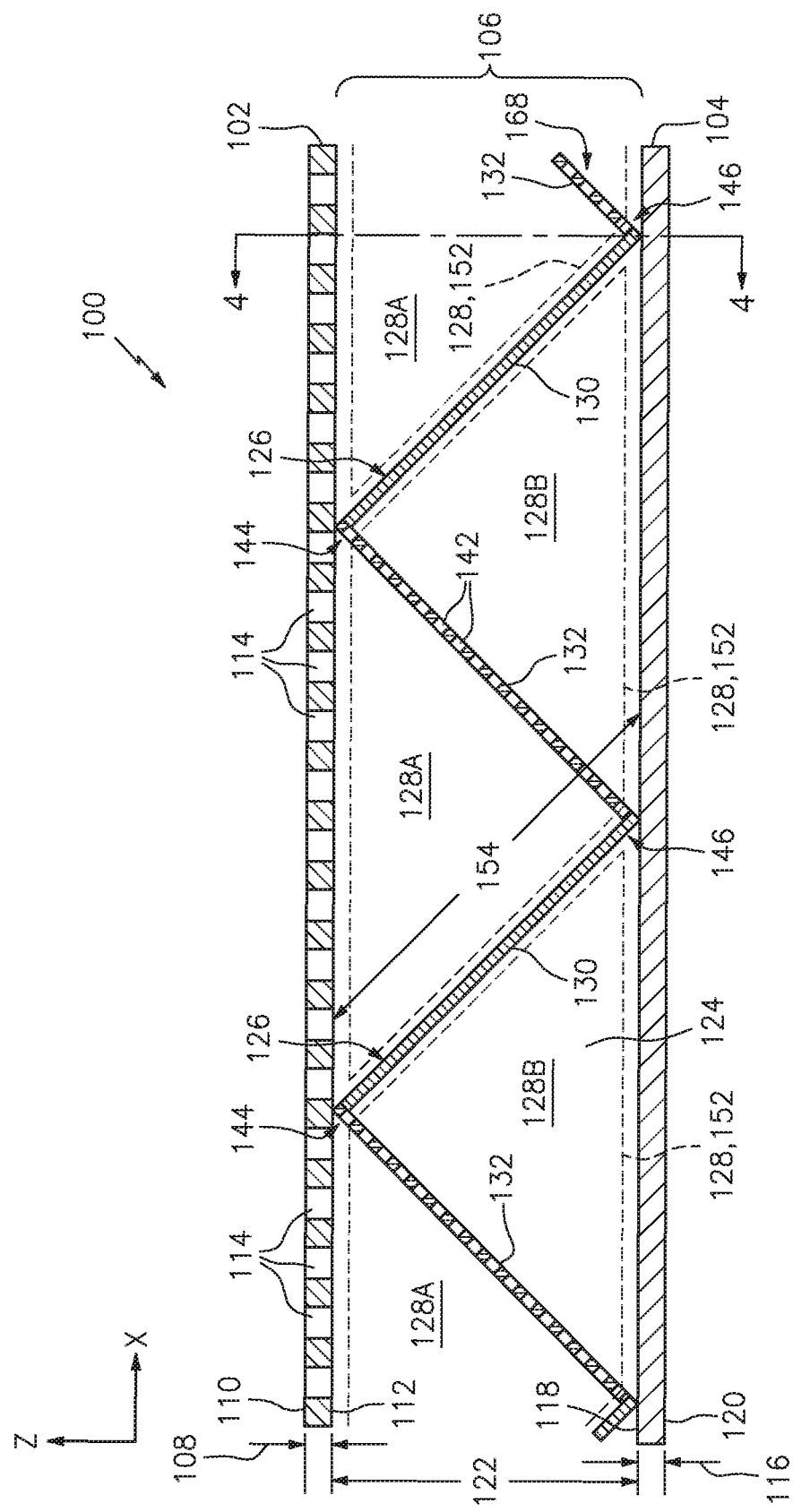
FIG. 2 is a first side sectional illustration of a portion of the acoustic panel, in accordance with various embodiments.

The first skin 102 may be configured as a relatively thin sheet or layer of material that extends longitudinally and laterally along the x-y plane. This first skin material may include, but is not limited to, a thermoplastic polymer, a thermoset polymer, a fiber reinforced polymer (thermoset or thermoplastic) matrix composite (e.g., fiberglass composite, carbon fiber composite, aramid fiber composite, composite reinforced by any combination of glass, carbon, aramid or other fibers, etc.), metal, alloys, metal matrix composite, ceramic, or ceramic matrix composite, or a combination thereof. Referring now to FIG. 2, the first skin 102 has a vertical thickness 108 that extends vertically between opposing side surfaces 110 and 112. The first skin 102 includes a plurality of perforations 114; e.g., apertures such as through-holes (see also FIG. 1). Each of these perforations 114 extends generally vertically through the first skin 102 between its side surfaces 110 and 112. In other embodiments, the perforations 114 may be non-uniform through the thickness 108 and/or may be non-perpendicular to the side surfaces 110 and/or 112.

The second skin 104 may be configured as a relatively thin sheet or layer of (e.g., continuous and uninterrupted) material that extends longitudinally and laterally along the x-y plane (see FIG. 1). This second skin material may include, but is not limited to, a thermoplastic polymer, a thermoset polymer, a fiber reinforced polymer (thermoset or thermoplastic) matrix composite (e.g., fiberglass composite, carbon fiber composite, aramid fiber composite, composite reinforced by any combination of glass, carbon, aramid or other fibers, etc.), metal, alloys, metal matrix composite, ceramic, or ceramic matrix composite, or a combination thereof. The second skin material may be the same as or different than the first skin material. The second skin 104 has a vertical thickness 116 that extends vertically between opposing side surfaces 118 and 120. This vertical thickness 116 may be substantially equal to or different (e.g., greater or less) than the vertical thickness 108 of the first skin 102. The thickness 108 of the first skin 102 and/or the thickness 116 of the second skin 104 may be uniform or non-uniform along the x-y plane.

Figure 3:
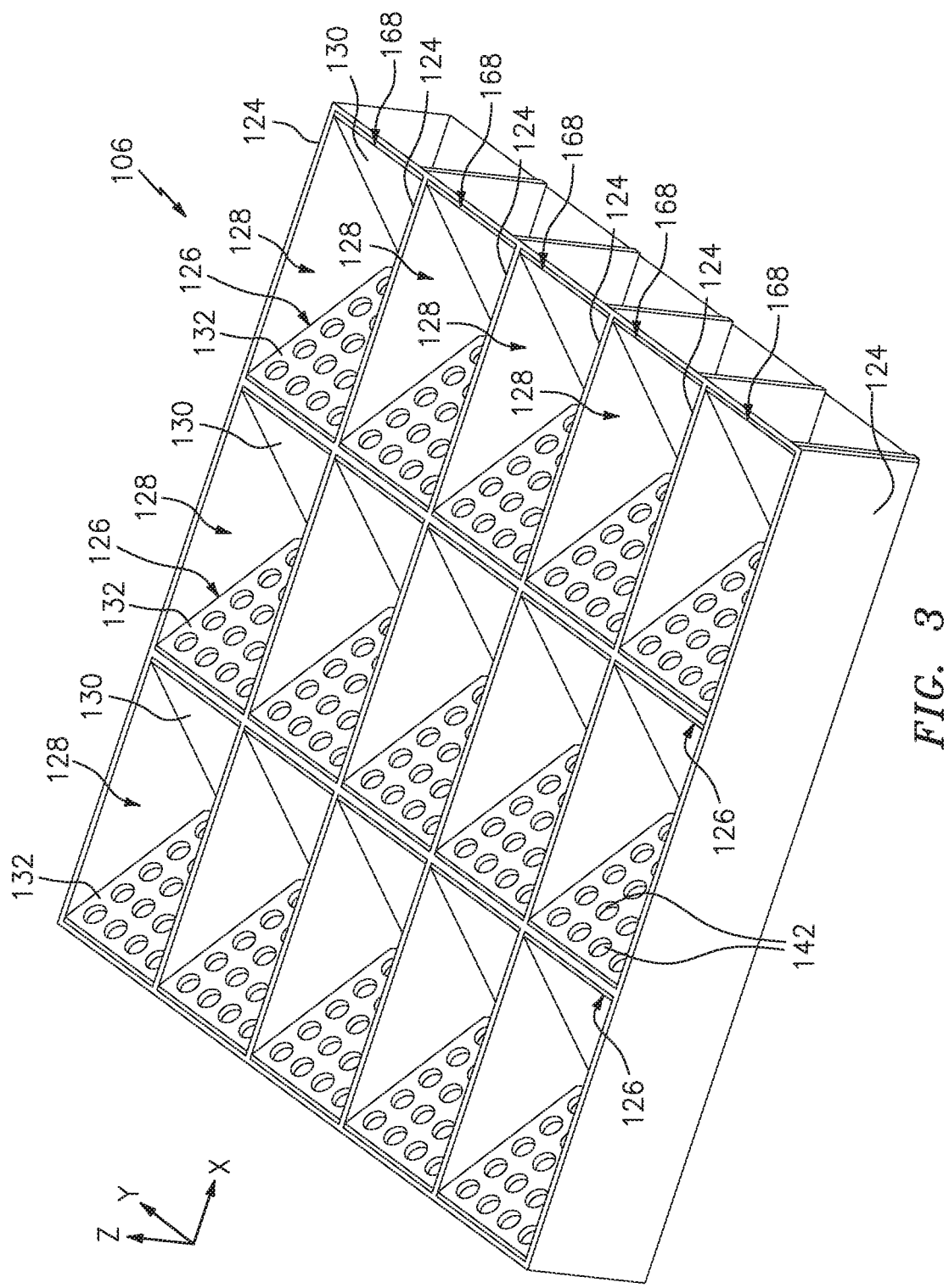
FIG. 3 is a perspective illustration of a cellular core of the acoustic panel portion, in accordance with various embodiments.

Referring to FIG. 3, the cellular core 106 extends longitudinally and laterally along the x-y plane. Referring again to FIG. 2, the cellular core 106 has a vertical thickness 122 that extends vertically between opposing core sides, which sides are respectively abutted against the first skin 102 and the second skin 104 and their side surfaces 112 and 118. The vertical thickness 122 may be substantially greater than the vertical thicknesses 108 and 116 of the first skin 102 and/or the second skin 104, respectively. The vertical thickness 122, for example, may be at least ten to forty times (10-40×), or more, greater than the vertical thicknesses 108 and 116; however, the acoustic panel 100 of the present disclosure is not limited to such an exemplary embodiment.

Figure 4:
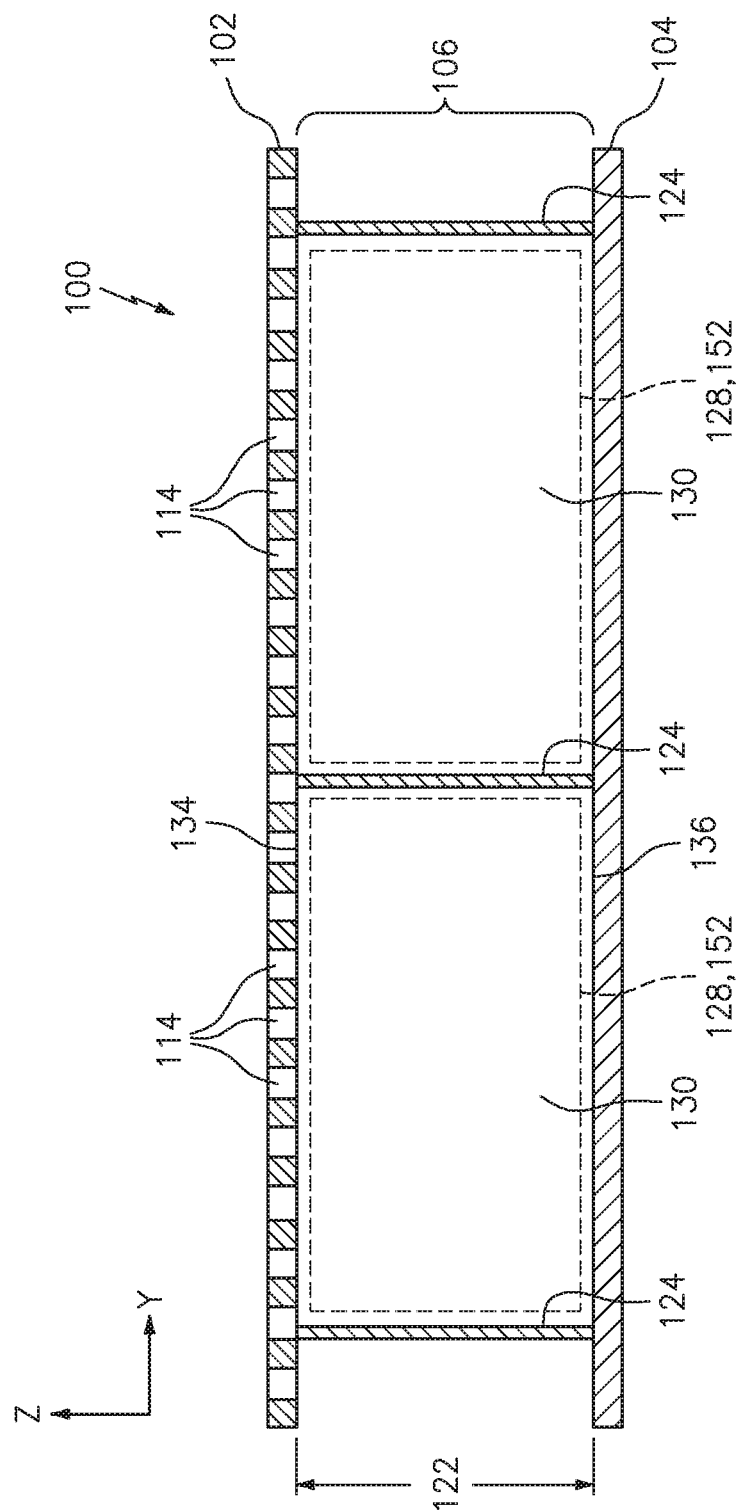
FIG. 4 is a second side sectional illustration of the acoustic panel portion, in accordance with various embodiments.

Referring to FIGS. 2-4, the cellular core 106 includes a plurality of solid non-perforated walls 124 (e.g., cavity sidewalls) and one or more arrays of corrugations 126. The walls 124 and corrugations 126 are arranged together to configure the cellular core 106 as an open cavity (e.g., open cell) structure. This open cavity structure forms a plurality of cavities 128 (each including divided sub-cavities 128A and 128B) vertically between the first skin 102 and the second skin 104. Each of these cavities 128 may be fluidly coupled with one or more respective perforations 114 in the first skin 102 (see FIG. 2).

Referring to FIG. 3, each of the walls 124 has a length that extends longitudinally along the x-axis. Each of the walls 124 has a thickness that extends laterally along the y-axis. Referring now to FIG. 4, each of the walls 124 has a height 122 that extends vertically between the first skin 102 and the second skin 104.

Each of the walls 124 is at least partially (or completely) connected to or otherwise engaged with the first skin 102 and/or the second skin 104. Each of the exemplary walls 124 of FIG. 4 is orientated substantially perpendicular to the first skin 102 and the second skin 104; e.g., at a ninety-degree angle to the skins 102 and 104. However, in other embodiments, one or more of the walls 124 may be angularly offset from the first skin 102 and/or the second skin 104 by a non-ninety-degree angle; e.g., an acute angle or an obtuse angle.

The walls 124 are arranged generally parallel with one another; see also FIG. 3. The walls 124 are laterally spaced from one another along the y-axis so as to respectively form the cavities 128 between the walls 124. Each of the walls 124 shown in FIG. 4 therefore respectively forms lateral sides of adjacent cavities 128 on either side of the respective wall 124. Each of the walls 124 thereby also fluidly separates those cavities 128 on either side of the wall 124.

Referring to FIG. 3, the corrugations 126 in each array are disposed and extend laterally between a laterally adjacent pair of the walls 124; see also FIG. 4. Each of the corrugations 126 includes a solid non-perforated baffle 130 and a porous (e.g., perforated) septum 132. In another exemplary embodiment, one or more or each of the corrugations 126 includes only porous (e.g. perforated) septa 132, or only solid non-perforated baffles 130 in an alternating periodic or non-periodic pattern along the y-axis or the x-axis or both.

Figure 5:
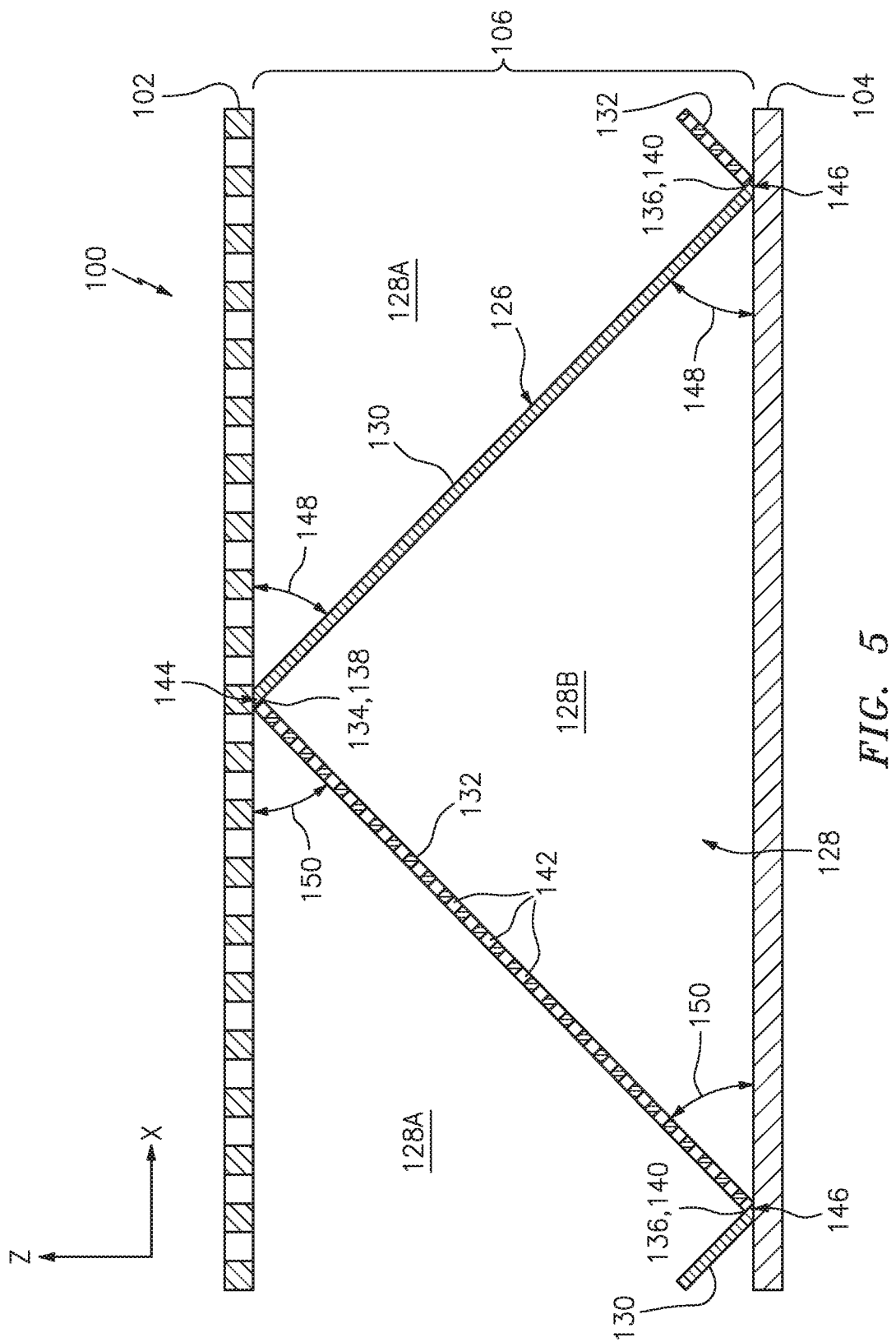
FIG. 5 is a partial enlarged view of the acoustic panel portion of FIG. 2, in accordance with various embodiments.

Referring to FIGS. 4 and 5, the baffle 130 has a width extending laterally between opposing lateral sides. These lateral sides are at least partially (or completely) connected to or otherwise engaged with a respective laterally adjacent pair of the walls 124. Referring to FIG. 5, the baffle 130 has a length extending diagonally (e.g., vertically and longitudinally) between opposing top and bottom ends 134 and 136. Note, the terms "top" and "bottom" are used above to describe ends of the baffle 130 as situated in the drawings and are not intended to limit the baffle 130 or the acoustic panel 100 to such an exemplary gravitational orientation.

The septum 132 has a width extending laterally between opposing lateral sides. These lateral sides are connected to or otherwise engaged with a respective laterally adjacent pair of the walls 124. The septum 132 has a length extending diagonally (e.g., vertically and longitudinally) between opposing top and bottom ends 138 and 140. Note, the terms "top" and "bottom" are used above to describe ends of the septum 132 as situated in the drawings and are not intended to limit the septum 132 or the acoustic panel 100 to such an exemplary gravitational orientation.

The septum 132 includes one or more perforations 142. In the exemplary embodiment of FIG. 5, the perforations 142 are configured as through holes. However, in other embodiments, the perforations 142 may be formed by interconnected pores in the septum 132 where the septum material, for example, has an open cell porous structure.

The top end 134 of the baffle 130 is connected at least partially (or completely) to or otherwise engaged with the first skin 102. This top end 134 is also longitudinally connected to the top end 138 of the septum 132 at an interface 144 between the baffle 130 and the septum 132. The bottom end 136 of the baffle 130 is connected to or otherwise engaged with the second skin 104. This bottom end 136 is also longitudinally connected to the bottom end 140 of a septum 132 of an adjacent one of the corrugations 126 at an interface 146. With the foregoing configuration, the baffle 130 extends vertically between the first skin 102 and the second skin 104 and longitudinally between the septums 132. The baffle 130 is therefore angularly offset from the first skin 102 and the second skin 104 by an included angle 148; e.g., between 30-60 degrees. This angle 148 is an acute angle such as, but not limited to, about forty-five degrees (45°).

Figure 6:
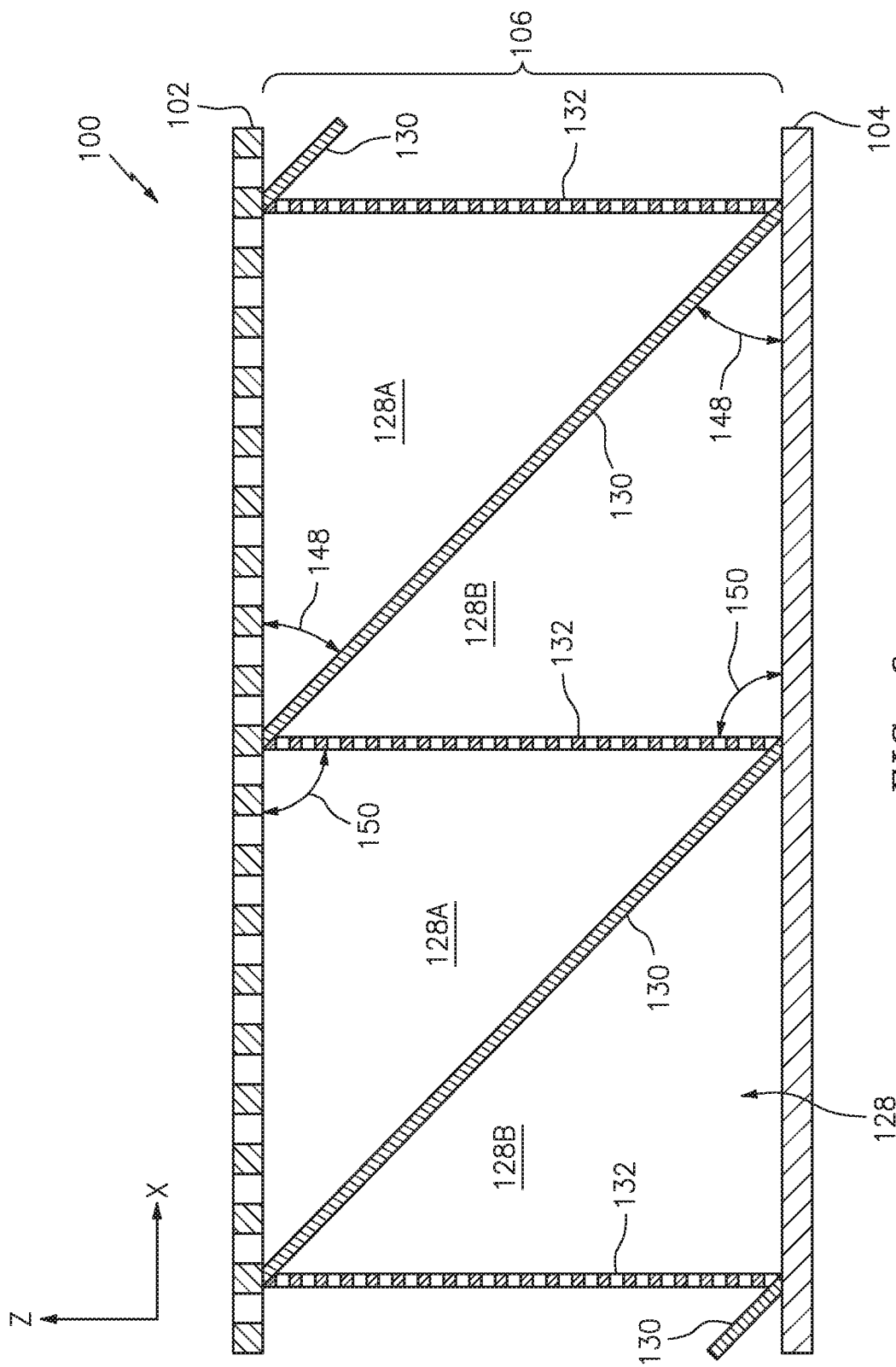
FIG. 6 is a first side sectional illustration of a portion of another acoustic panel, in accordance with various embodiments.

The top end 138 of the septum 132 is at least partially (or completely) connected to or otherwise engaged with the first skin 102. This top end 138 is also longitudinally connected to the top end 134 of the baffle 130 as described above. The bottom end 140 of the septum 132 is at least partially (or completely) connected to or otherwise engaged with the second skin 104. This bottom end 140 is also longitudinally connected to the bottom end 136 of a baffle 130 of an adjacent one of the corrugations 126 at an interface; e.g., the interface 146. With the foregoing configuration, the septum 132 extends vertically between the first skin 102 and the second skin 104 and longitudinally between the baffles 130. The septum 132 is therefore angularly offset from the first skin 102 and the second skin 104 by an included angle 150; e.g., between 30-60 degrees. This angle 150 may be an acute angle such as, but not limited to, about forty-five degrees (45°). The angle 150 may be substantially equal to the angle 148 as shown in FIG. 5. Alternatively, the angle 150 may be different from the angle 148; e.g., a larger or smaller acute angle, or a right angle. For example, the angle 150 may be about ninety degrees (90°) and the angle 148 may be about forty-five degrees (45°) as shown in FIG. 6. In another example, the angle 148 may be about ninety degrees (90°) and the angle 150 may be about forty-five degrees (45°).

Referring to FIG. 2, each of the cavities 128 extends longitudinally between and is formed by a longitudinally adjacent pair of the baffles 130. Each septum 132 is disposed within and divides a respective one of the cavities 128 into fluidly coupled sub-cavities 128A and 128B. More particularly, the perforations 142 in the septum 132 fluidly couple the sub-cavities 128A and 128B together.

Each of the cavities 128 forms a resonance chamber 152. A length 154 of the resonance chamber 152 extends diagonally (e.g., longitudinally and vertically) between the first skin 102 and the second skin 104 and through a respective one of the septums 132. The length 154 of the resonance chamber 152 therefore is longer than the vertical thickness 122 of the cellular core 106. This enables noise attenuation of relatively low frequency noise without increasing the vertical thickness 122 of the cellular core 106 and, thus, a vertical thickness of the acoustic panel 100. For example, each resonance chamber 152 may receive noise waves through the perforations 114 in the first skin 102. The resonance chamber 152 may reverse the phase of one or more frequencies of those sound waves using known acoustic reflection principles and subsequently direct the reverse phase sound waves out of the acoustic panel 100 through the perforations 114 to destructively interfere with other incoming noise waves.

The cellular core 106 may be constructed from any suitable material or materials. The cellular core 106, for example, may be constructed from a thermoplastic polymer, a thermoset polymer, a fiber reinforced thermoset or thermoplastic polymer matrix composite (e.g., fiberglass composite, carbon fiber composite, aramid fiber composite, composite reinforced by any combination of glass, carbon, aramid or other fibers), metal, alloys, metal matrix composite, ceramic, or ceramic matrix composite, or a combination thereof. One or more of the components of the cellular core 106 may be constructed from the same or a like material. Alternatively, one or more of the components of the cellular core 106 may be constructed from a different material than one or more of the other components of the cellular core 106. Furthermore, the cellular core 106 may be constructed from the same material(s) as the first skin 102 and/or the second skin 104, or from a different material or materials.

Referring to FIGS. 7 to 15, one or more elements 156A-F (generally referred to as "156") of the acoustic panel 100 and, more particularly, the cellular core 106 may be configured with one or more structural reinforcements 158A-F (generally referred to as "158"). These structural reinforcements 158 are provided to increase rigidity, stability, strength and/or structural integrity of the corresponding element(s) 156 as well as the acoustic panel 100 as a whole. Examples of the one or more elements 156 include, but are not limited to: (A) one, some or each of the baffles 130; (B) one, some or each of the septums 132; (C) one, some or each of the arrays of corrugations 126; and (D) a combination of any two or more of (A) to (C). In some embodiments, the elements 156 may also or alternatively include one, some or each of the walls 124.

Figure 7:
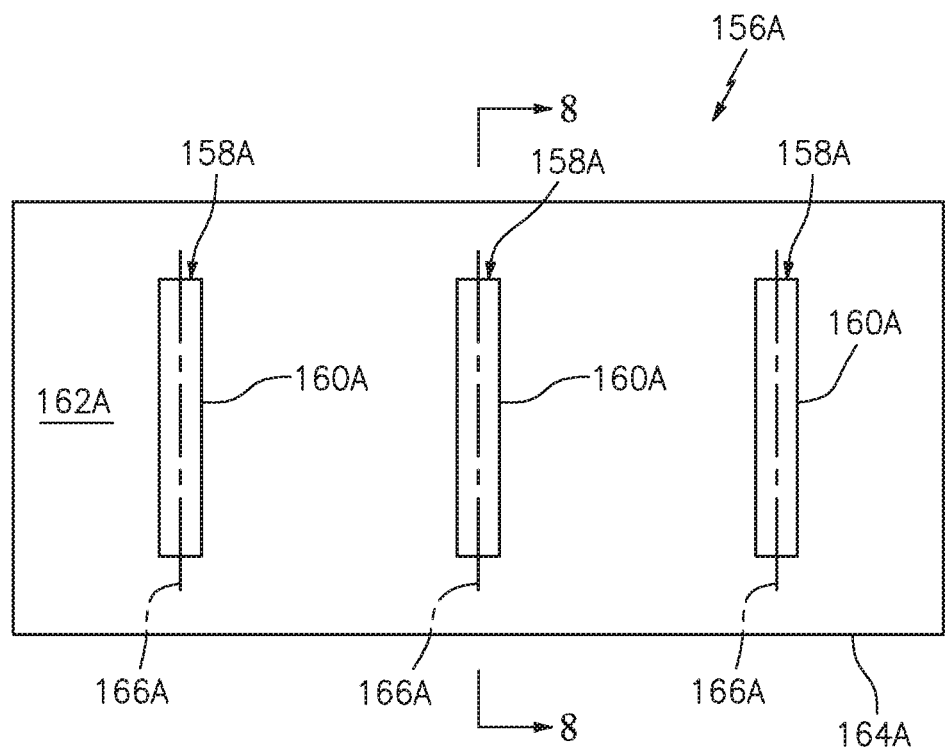
FIG. 7 is an illustration of a portion of a panel element configured with a plurality of structural reinforcements, in accordance with various embodiments.
Figure 8:
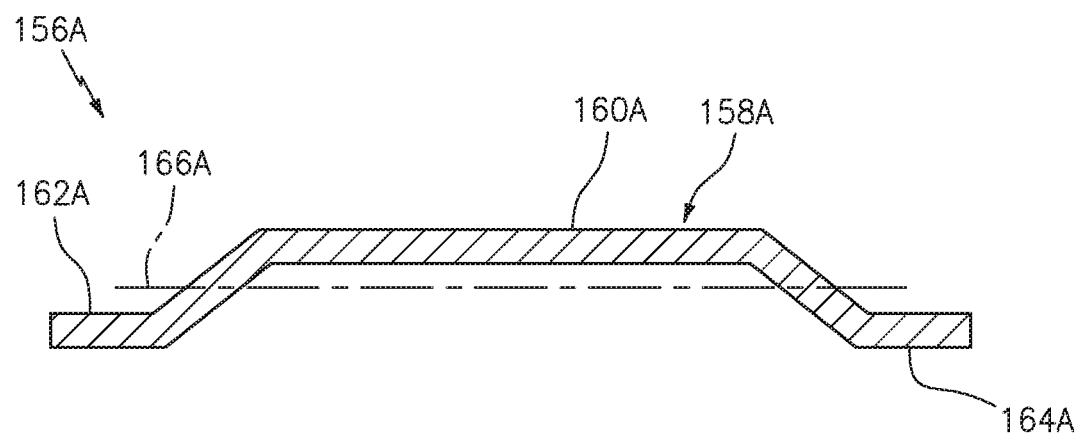
FIG. 8 is a side sectional illustration of the panel element portion of FIG. 7, in accordance with various embodiments.

FIGS. 7 and 8 illustrate a portion of the acoustic panel element 156A configured with an array of the structural reinforcements 158A. Each structural reinforcement 158A of FIGS. 7 and 8 is configured as a discrete rib 160A. Each rib 160A may be stamped, molded and/or otherwise formed in the acoustic panel element 156A to project out from an exterior surface 162A of the acoustic panel element 156A. More particularly, each rib 160A is formed in the acoustic panel element 156A to project out from a (e.g., planar) base 164A of the acoustic panel element 156A, which base 164A defines the exterior surface 162A.

Each rib 160A extends along a trajectory 166A, where the trajectories 166A of the ribs 160A may be parallel with one another as shown in FIG. 7. In other embodiments, however, the trajectories 166A of some of the ribs 160A may be non-parallel; e.g., angled to one another. Note, the term "trajectory" may describe a centerline that follows along a length of a feature, where that length is greater than other dimensions (e.g., a width and/or a thickness) of the feature. Each trajectory 166A of FIG. 7 is a straight-line trajectory. However, in other embodiments, the trajectory 166A of one or more of the ribs 160A may alternatively be a curved or otherwise convoluted line trajectory.

Figure 9:
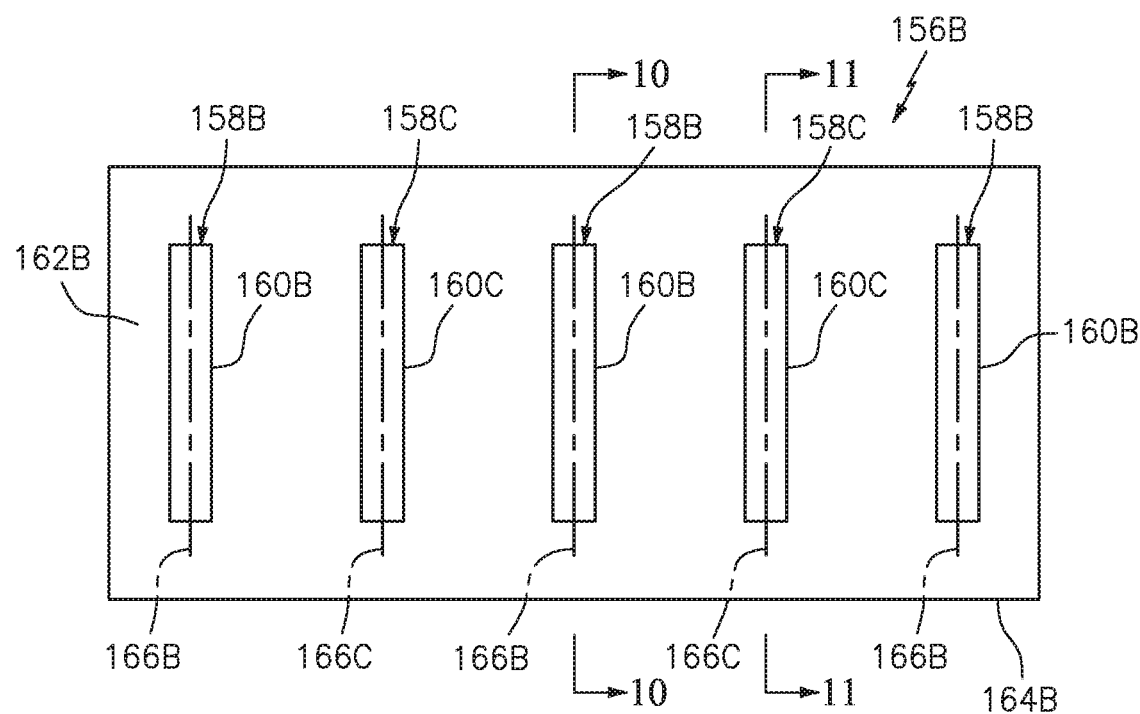
FIG. 9 is an illustration of a portion of another panel element configured with a plurality of structural reinforcements, in accordance with various embodiments.
Figure 10:
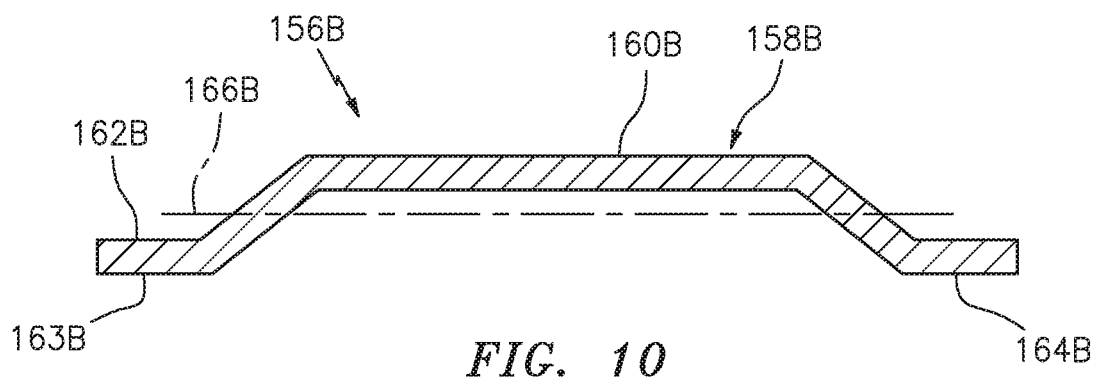
FIG. 10 is a side sectional illustration of the panel element portion of FIG. 9, in accordance with various embodiments.
Figure 11:
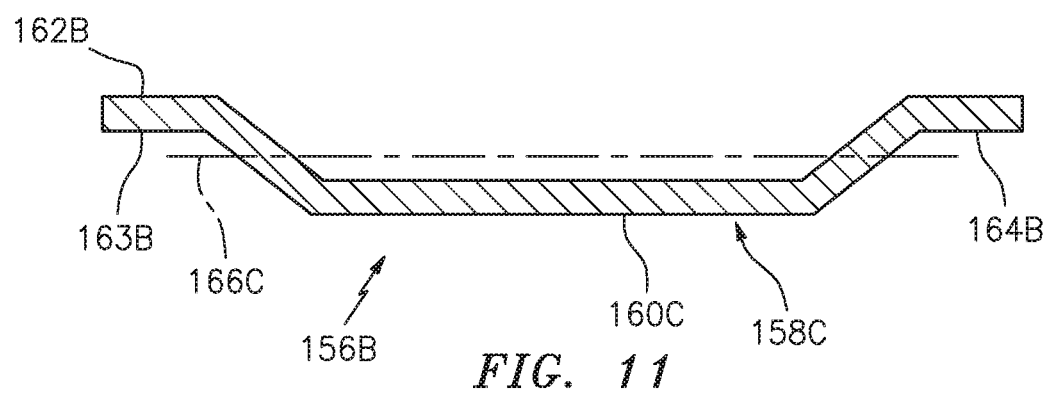
FIG. 11 is another side sectional illustration of the panel element portion of FIG. 9, in accordance with various embodiments.
Figure 12:
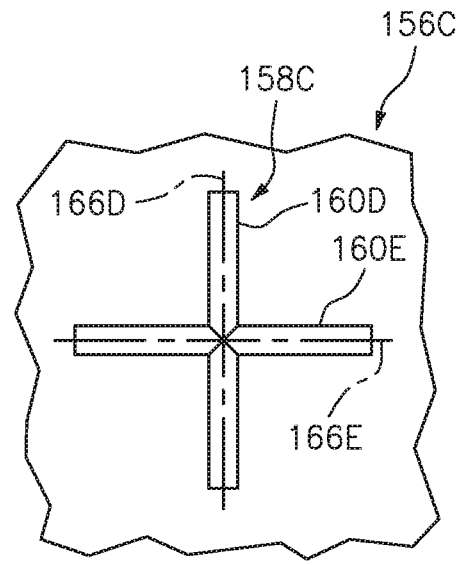
FIG. 12 is an illustration of a portion of another panel element configured with a structural reinforcement, in accordance with various embodiments.

FIGS. 9 to 11 illustrate a portion of the acoustic panel element 156B configured with an array of the structural reinforcements 158B and 158C. Each structural reinforcement 158B, 158C of FIGS. 9 to 11 is configured as a discrete rib 160B, 160C. Each rib 160B may be formed in the acoustic panel element 156B to project out from an exterior surface 162B of the acoustic panel element 156B. More particularly, each rib 160B is formed in the acoustic panel element 156B to project out from a (e.g., planar) base 164B of the acoustic panel element 156B, which base 164B defines the exterior surface 162B and an opposite exterior surface 163B. Each rib 160C may be formed in the acoustic panel element 156B to project out from the exterior surface 163B. More particularly, each rib 160C is formed in the acoustic panel element 156B to project out from the base 164B such that each rib 160C is arranged on an opposing side of the base 164B from each rib 160B.

Each rib 160B extends along a trajectory 166B, where the trajectories 166B of the ribs 160B may be parallel with one another as shown in FIG. 9. In other embodiments, however, the trajectories 166B of some of the ribs 160B may be non-parallel; e.g., angled to one another. Each rib 160C extends along a trajectory 166C, where the trajectories 166C of the ribs 160C may be parallel with one another as shown in FIG. 9. In other embodiments, however, the trajectories 166C of some of the ribs 160C may be non-parallel; e.g., angled to one another. The trajectories 166B of the ribs 160B may also be parallel with the trajectories 166C of the ribs 160C as shown in FIG. 9. In other embodiments, however, the trajectories 166B and 166C of some of the ribs 160B and 160C may be non-parallel; e.g., angled to one another. Each trajectory 166B, 166C of FIG. 9 is straight-line trajectory. However, in other embodiments, the trajectory 166B, 166C of one or more of the ribs 160B, 160C may alternatively be a curved or otherwise convoluted line trajectory.

Figure 13:
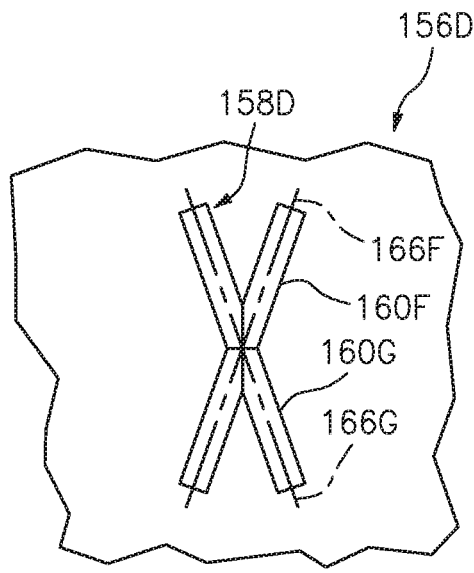
FIG. 13 is an illustration of a portion of another panel element configured with a structural reinforcement, in accordance with various embodiments.
Figure 14:
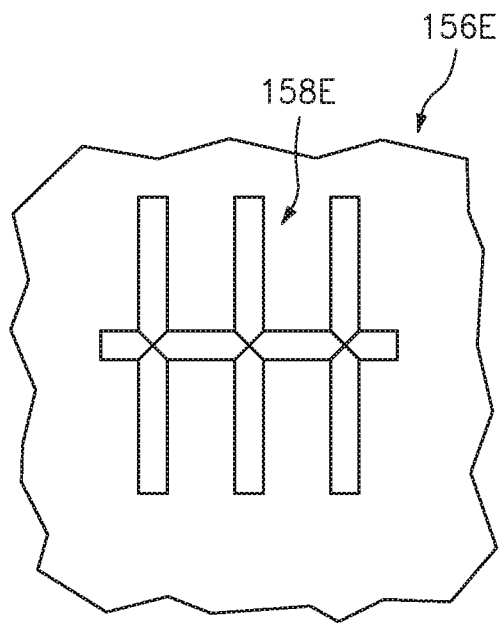
FIG. 14 is an illustration of a portion of another panel element configured with a structural reinforcement, in accordance with various embodiments.
Figure 15:
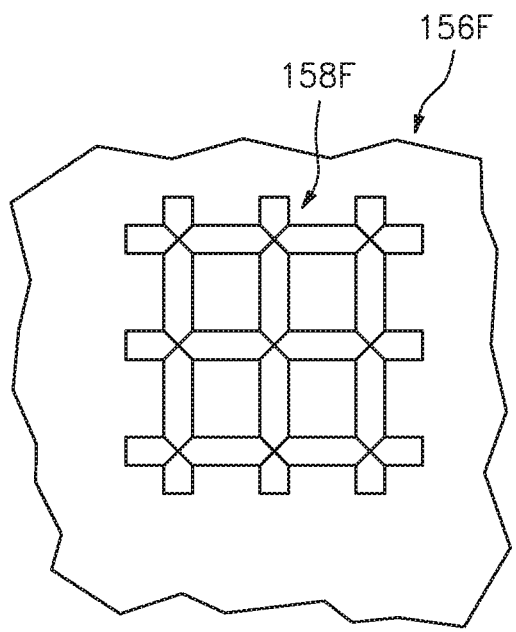
FIG. 15 is an illustration of a portion of still another panel element configured with a structural reinforcement, in accordance with various embodiments.

Each structural reinforcement 158 describe above includes a single discrete rib (generally referred to as "160"). However, in other embodiments, one or more of the structural reinforcements (e.g., 158C-F) may each include a plurality of interconnected ribs as shown, for example, in FIGS. 12 to 15. The structural reinforcement 158C of FIG. 12, for example, includes a first rib 160D and a second rib 160E. The first rib 160D extends along a first trajectory 166D and the second rib 160E extends along a second trajectory 166E. The first trajectory 166D and the second trajectory 166E are straight-line trajectories; however, in other embodiments, one or both of these trajectories 166D and 166E may alternatively be curved or otherwise convoluted line trajectories. The first trajectory 166D of the first rib 160D is non-parallel with the second trajectory 166E of the second rib 160E. The first trajectory 166D and the first rib 160D of FIG. 12, for example, are perpendicular and coincident with the second trajectory 166E and the second rib 160E. Of course, in other embodiments, an included angle between first and second trajectories 166F and 166G and ribs 160F and 160G of the structural reinforcement 158D may be acute (or obtuse) as shown in FIG. 13 for example. Referring again to FIG. 12, the first rib 160D intersects and thereby runs into the second rib 160E. The first rib 160D of FIG. 12, for example, bisects the second rib 160E and the second rib 160E bisects the first rib 160D.

Figure 16:
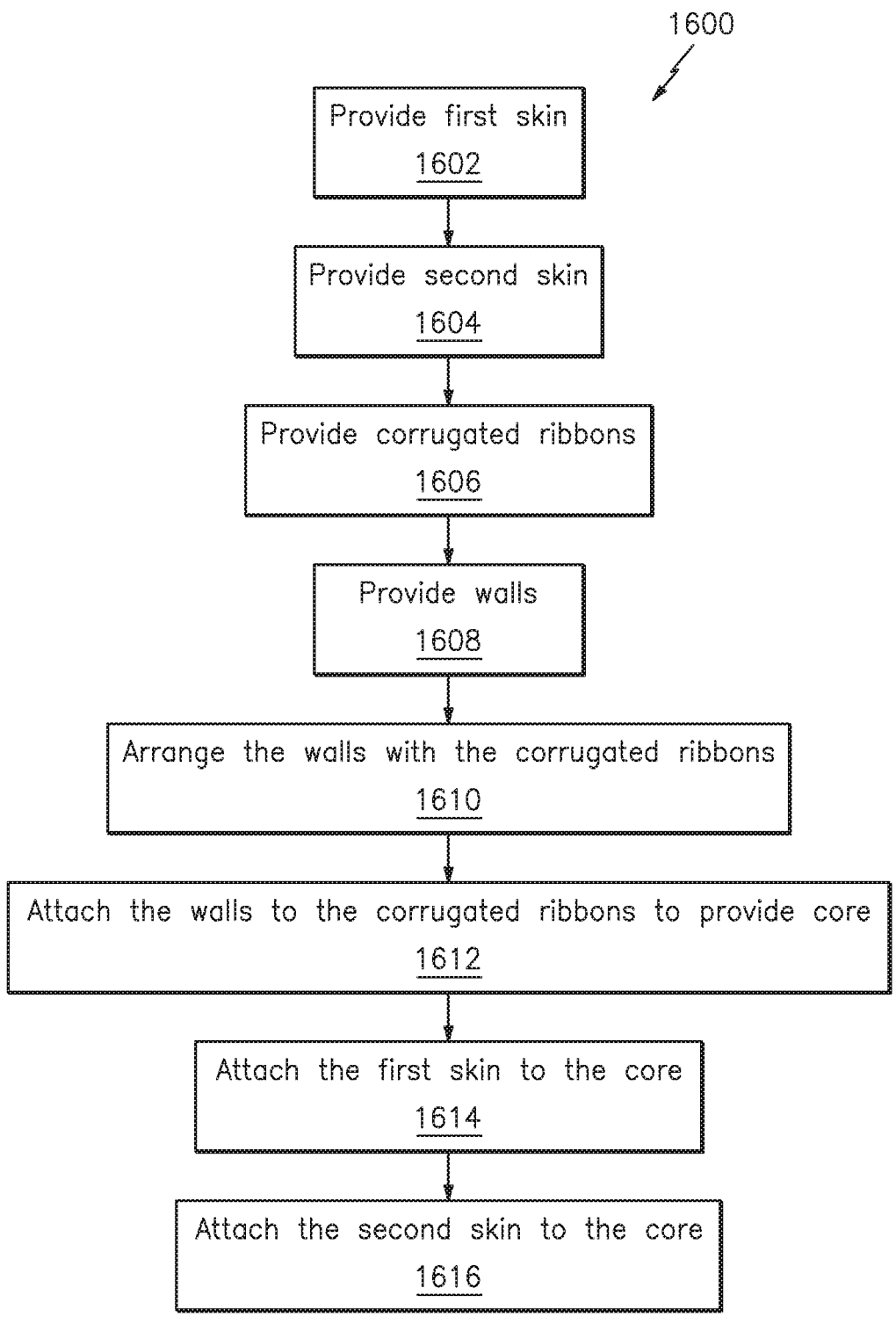
FIG. 16 is a flow diagram of a method for forming a structured panel, in accordance with various embodiments.

FIG. 16 is a flow diagram of a method 1600 for forming a structured panel such as, but not limited to, the structured panel 100 embodiments described above.

In step 1602, the first skin 102 is formed or otherwise provided. This first skin 102 may be constructed from polymer material such as, but not limited to, thermoplastic polymer material or thermoset polymer material. For example, the first skin 102 may be constructed from a layup of fiber reinforcement within a polymer (e.g., thermoplastic or thermoset) matrix. Examples of fiber reinforcement include, but are not limited to, continuous, long discontinuous, short chopped and/or fabric (woven) or other arrangement of fibers of fiberglass, carbon fibers, aramid fibers or any combination thereof. These fibers may be arranged in one or more plies, a three-dimensional (3D) woven body, or any other arrangement. In other embodiments, however, the first skin 102 may be formed from another non-polymeric material such as, but not limited to, sheet metal or ceramic material, or ceramic matrix composite material. The first skin 102 may be perforated during this step 1602 using a perforation technique such as, but not limited to, mechanical or laser drilling. Alternatively, the first skin 102 may be perforated subsequent to being attached to the core 106.

In step 1604, the second skin 104 is formed or otherwise provided. This second skin 104 may be constructed from polymer material such as, but not limited to, thermoplastic polymer material or thermoset polymer material. For example, the second skin 104 may be constructed from a layup of fiber reinforcement within a polymer (e.g., thermoplastic or thermoset) matrix. Examples of fiber reinforcement include, but are not limited to, continuous, long discontinuous, short chopped and/or fabric (woven) or other arrangement of fibers of fiberglass, carbon fibers, aramid fibers or any combination thereof. These fibers may be arranged in one or more plies, a three-dimensional (3D) woven body, or any other arrangement. In other embodiments, however, the second skin 104 may be formed from another non-polymeric material such as, but not limited to, sheet metal or ceramic material, or ceramic matrix composite material.

In step 1606, a plurality of corrugated ribbons 168 (see FIGS. 2 and 3) are formed or otherwise provided. Each of these corrugated ribbons 168 includes a respective one of the longitudinally extending arrays of the corrugations 126 and, thus, sets of baffles 130 and septums 132. Each corrugated ribbon 168 may be constructed from polymer material such as, but not limited to, thermoplastic material or thermoset material. For example, each corrugated ribbon 168 may be constructed from a layup of fiber reinforcement within a polymer (e.g., thermoplastic or thermoset) matrix. Examples of fiber reinforcement include, but are not limited to, continuous, long discontinuous, short chopped and/or fabric (woven) or other arrangement of fibers of fiberglass, carbon fibers, aramid fibers or any combination thereof. These fibers may be arranged in one or more plies, a three-dimensional (3D) woven body, or any other arrangement. In other embodiments, however, each corrugated ribbon 168 may be formed from another non-polymeric material such as, but not limited to, sheet metal or ceramic material, or ceramic matrix composite material.

Figure 17:
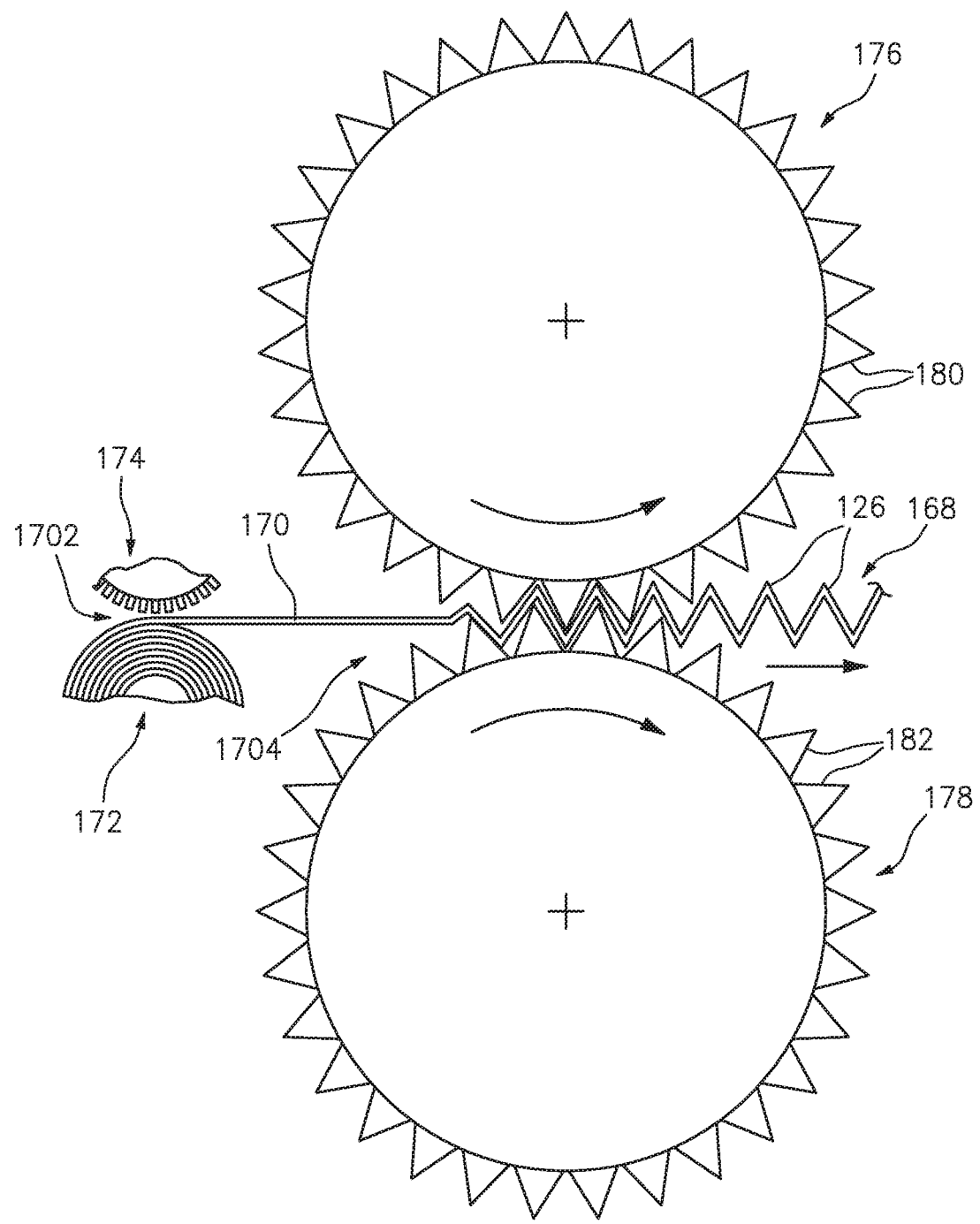
FIG. 17 is a schematic illustration of an exemplary sequence of processes for forming a corrugated ribbon, in accordance with various embodiments.

FIG. 17 schematically illustrates an exemplary sequence of processes for forming the corrugated ribbons 168. At point 1702, a ribbon of material 170 (e.g., fiber-reinforced thermoplastic or thermoset polymer or polymer matrix composite) is provided. The ribbon of material 170 may be formed from a stock roll 172 of fiber-reinforced thermoplastic consolidate laminate, which may be processed (e.g., rolled and/or cut) to provide the ribbon with a predetermined width and thickness. Alternatively, short chopped fibers within a thermoplastic resin matrix may be extruded into the ribbon of material 170. Still alternatively, the ribbon of material 170 may be formed from a stock roll 172 of fiber-reinforced thermoset polymer or polymer matrix composite fabric or matt or prepreg that is partially cured, which may be processed (e.g., rolled and/or cut) to provide the ribbon with a predetermined width and thickness. Of course, various other processes may also or alternatively be used to provide the ribbon of material 170.

Also at point 1702 or alternatively later downstream, a plurality of perforations are formed in discrete regions of the ribbon of material 170. These perforations will become the perforations 142 in the septums 132, and the perforated regions will become the septums 132. The non-perforated regions of the ribbon of material 170 will become the baffles 130. The perforations may be formed in the regions of the ribbon of material 170 via punching, or using any other suitable technique. For example, the ribbon of material 170 may be pressed against a roller 174 with punches thereon, or against one or more wheels with punches thereon. Of course, in alternative embodiments, the perforations may be formed (e.g., punch, mechanical or laser drilled, etc.) after corrugated ribbon 168 and/or core 106 formation.

At point 1704, a respective portion of the perforated ribbon of material 170 is corrugated to provide respective corrugations 126 and thereby form a corrugated ribbon 168. For example, the perforated ribbon of material 170 may be fed between first and second rollers 176 and 178; e.g., roller dies, gears. Each of these rollers 176 and 178 includes a plurality of teeth 180, 182 or other radial projections arranged in a circular array thereabout. As the first teeth 180 mesh with the second teeth 182, the ribbon of material 170 is bent back and forth thereby forming the corrugations 126.

In addition to corrugating the perforated ribbon of material 170, the first and the second rollers 176 and 178 are also configured to form one or more of the structural reinforcements 158 in one or more of the baffles 130 and/or one or more of the septums 132. For example, referring to FIGS. 18 to 20, each of the first teeth 180 may include one or more female die portions 184 and each of the second teeth 182 may include one or more male die portions 186. Each female die portion 184 may be configured as a shaped recess or indentation in a surface 188 of the first roller tooth 180. Each male die portion 186 may be configured as a corresponding shaped projection out from a surface 190 of the second roller tooth 182. With such a configuration, as the first teeth 180 and the second teeth 182 mesh together, each male die portion 186 mates with (projects into) a respective one of the female die portions 184 and thereby stamps a respective one of the structural reinforcements 158 in the corrugated ribbon 168.

Figure 18:
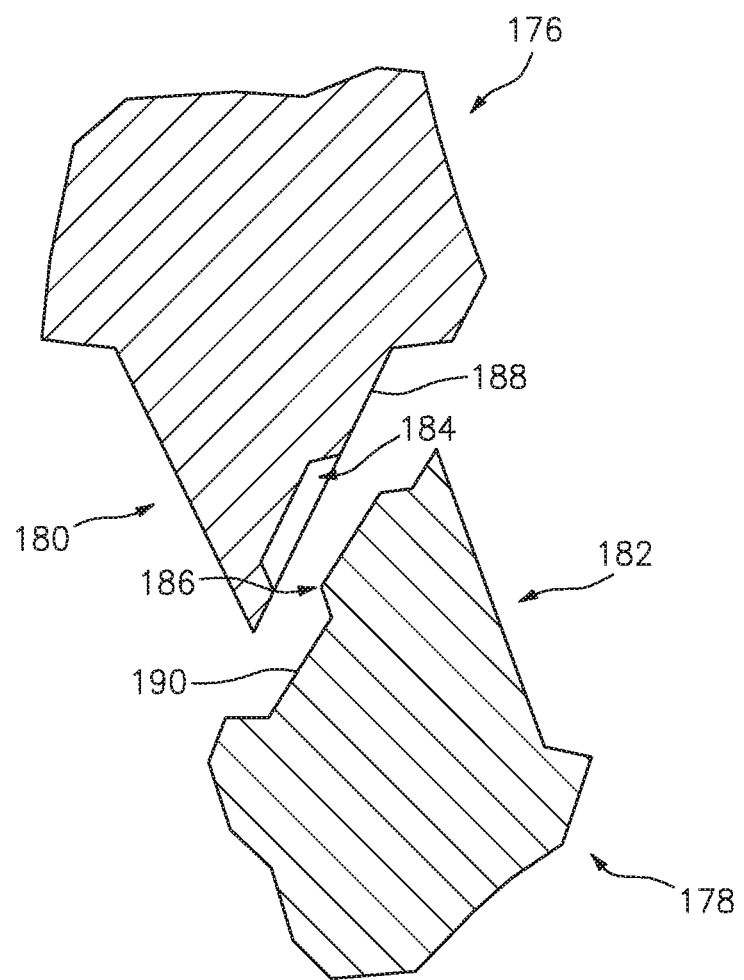
FIG. 18 is a side sectional illustration of roller teeth, in accordance with various embodiments.
Figure 19:
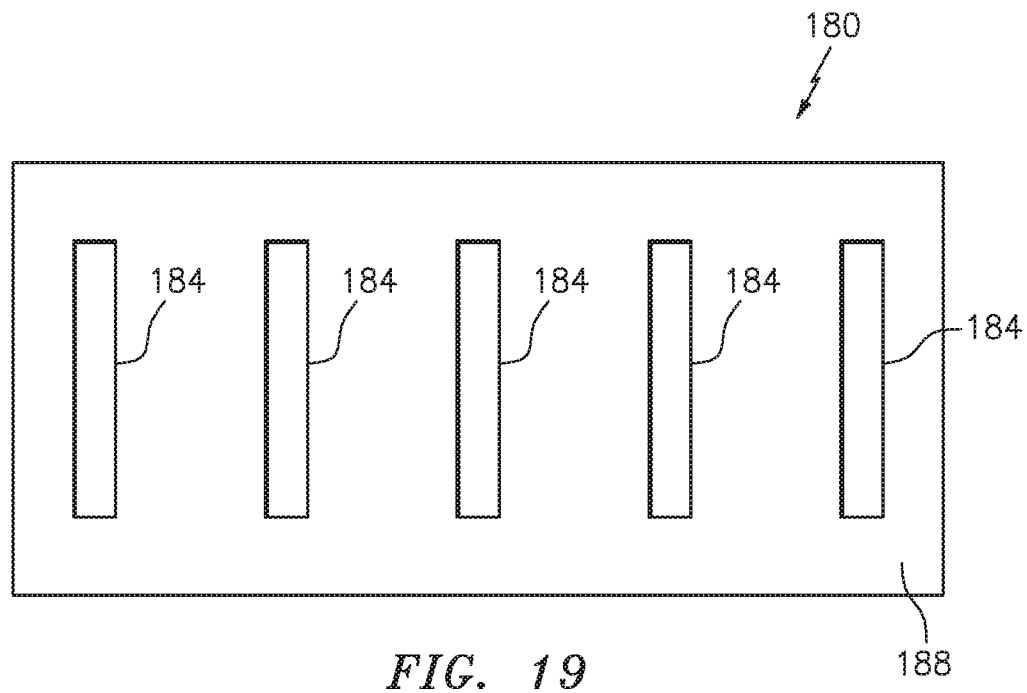
FIGS. 19 and 20 are illustrations of faces of the roller teeth of FIG. 18, in accordance with various embodiments.
Figure 20:
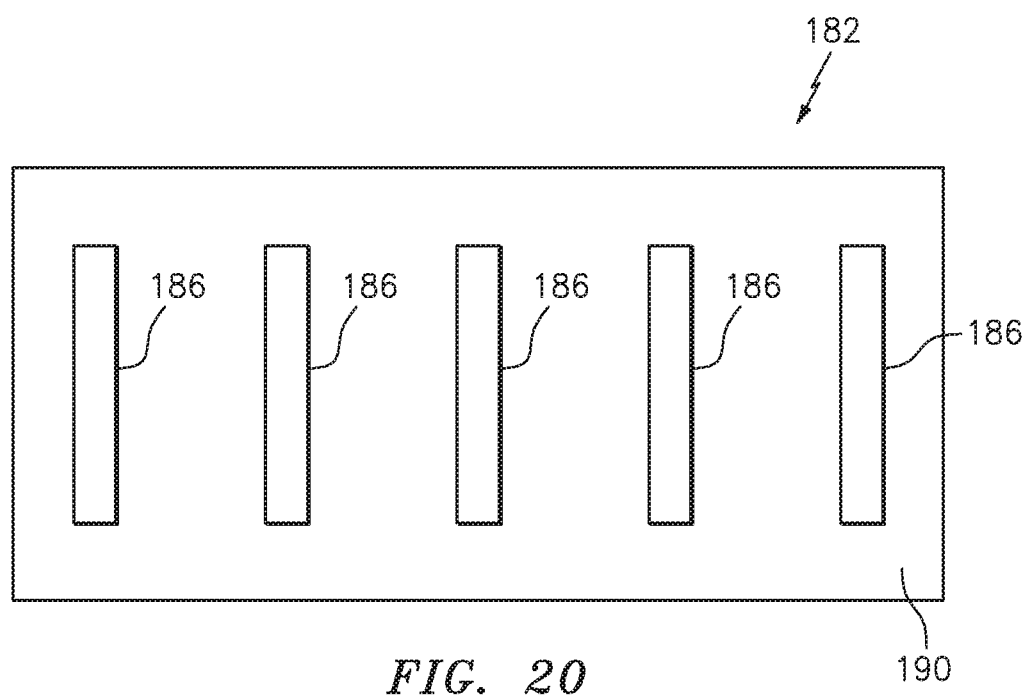
Figure 21:
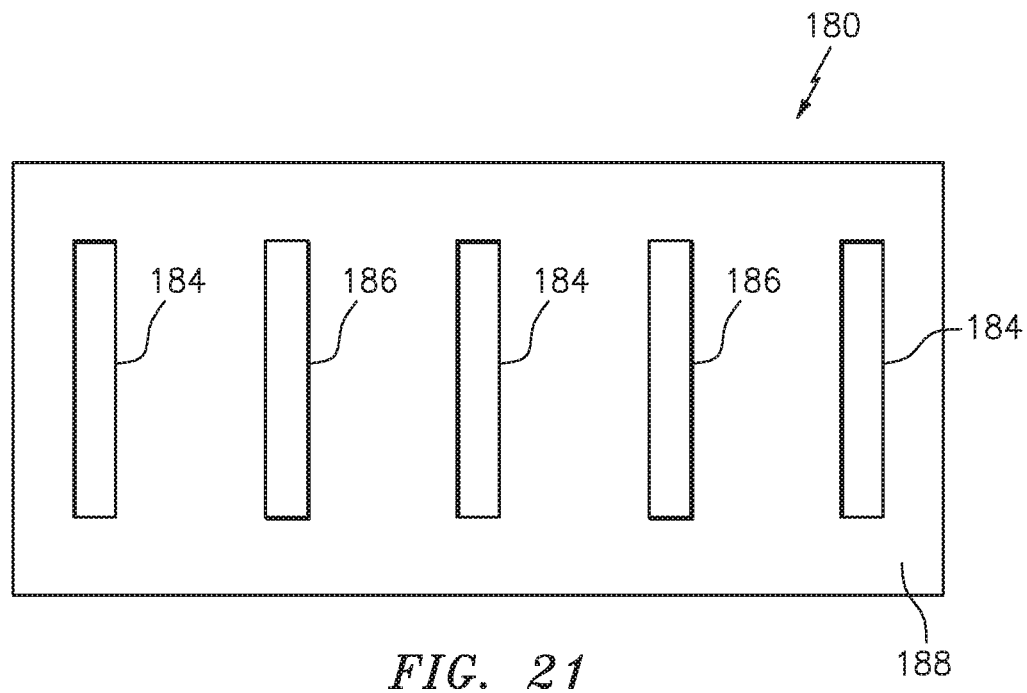
FIGS. 21 and 22 are illustrations of alternative faces for the roller teeth of FIG. 18, in accordance with various embodiments.
Figure 22:
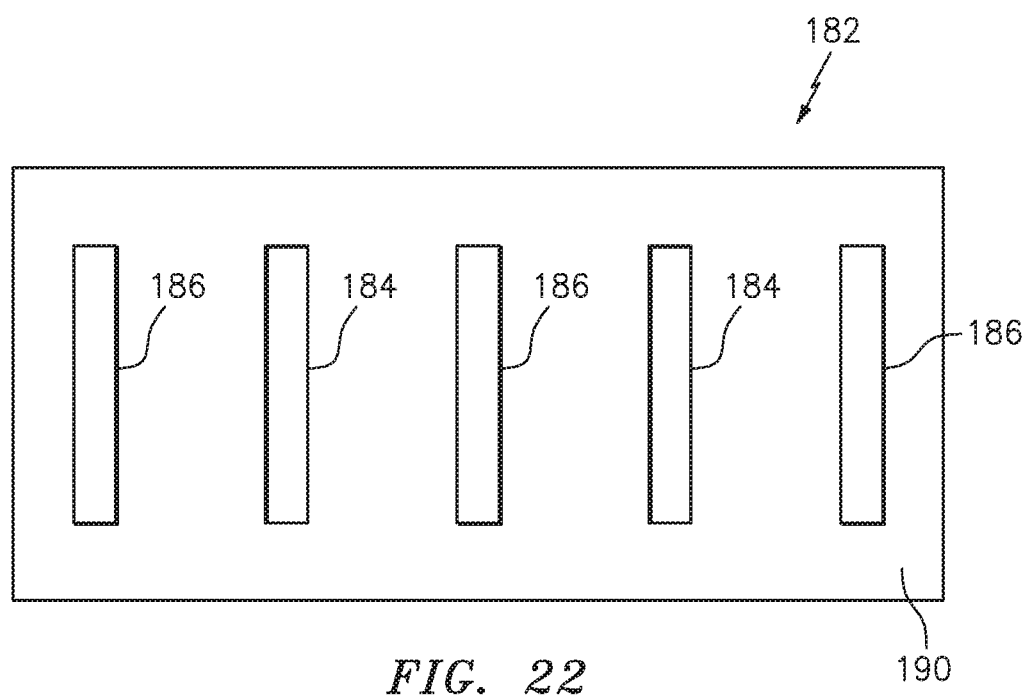

In the embodiment of FIGS. 18 to 20, the female die portions 184 are configured with the first roller 176 and the male die portions 186 are configured with the second roller 178. However, in other embodiments, both the first roller 176 and the second roller 178 may each include both female die portions 184 and male die portions 186. For example, referring to FIGS. 21 and 22, each first roller tooth 180 is configured with alternating female and male die portions 184 and 186 and each second roller tooth 182 is configured with alternative male and female die portions 186 and 184. With such a configuration, the rollers 176 and 178 may configure the corrugated ribbon of material 170 with structural reinforcements 158 as shown, for example, in FIGS. 9-11. The present disclosure is not limited to the above die portions configuration. Alternate embodiments, for example, can include any combinations of male and female die portions and die patterns on all or select first and second rollers teeth.

Where the ribbon of material 170 is a ribbon of thermoplastic polymer material or fiber reinforced thermoset polymer matrix material or partially cured thermoset polymer material or fiber reinforced thermoset polymer matrix material, the first roller 176 and/or the second roller 178 may be heated during the corrugating and the stamping. When thermoplastic polymer material or thermoplastic matrix composite is used, the ribbon may be thermoformed to the desired corrugated shape. When thermoset polymer material or matrix is used, the ribbon may be shaped and partially cured. However, where the ribbon of material 170 is or otherwise includes an uncured thermoset material, the first roller 176 and/or the second roller 178 may not (or may under certain conditions) be heated during the corrugating and the stamping, depending on targeted degree of partial or no curing of the thermoset polymer or thermoset polymer matrix material, respectively.

Referring again to FIG. 16, in step 1608, the walls 124 are formed or otherwise provided. Each wall 124 may be constructed from polymer material such as, but not limited to, thermoplastic polymer or fiber reinforced thermoplastic polymer matrix material or thermoset polymer or fiber reinforced thermoset polymer matrix material, or metal, or ceramic or ceramic matrix composite. For example, each wall 124 may be constructed from a layup of fiber reinforcement within a polymer (e.g., thermoplastic or thermoset) matrix. Examples of fiber reinforcement include, but are not limited to continuous, long discontinuous, short chopped and/or fabric (woven) or other arrangement of fibers of fiberglass, carbon fibers, aramid fibers or any combination thereof. These fibers may be arranged in one or more plies, a three-dimensional (3D) woven body, or any other arrangement.

In step 1610, the walls 124 are arranged with the corrugated ribbons 168. In particular, each corrugated ribbon 168 is arranged laterally between an adjacent pair of the walls 124.

In step 1612, the walls 124 are attached to the corrugated ribbons 168 to form the cellular core 106. The walls 124, for example, may be bonded to the corrugated ribbons 168 using, for example, ultrasonic welding, resistance welding, consolidation within an autoclave or other means (e.g., tooling with a device for exerting pressure such as a press), welding via induction heating, or adhering with an adhesive. Of course, other bonding techniques may also or alternatively be used to attach each wall 124 to the respective corrugated ribbon(s) 168.

In step 1614, the first skin 102 is bonded or otherwise attached to the core 106. In step 1616, the second skin 104 is bonded or otherwise attached to the core 106. The steps 1614 and 1616 may be performed sequentially (e.g., either 1614 and then 1616, or 1616 and then 1614). Alternatively, the steps 1614 and 1616 may be performed substantially simultaneously.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for forming a structured panel, comprising:
   forming a cellular core that comprises a corrugated ribbon configured with a plurality of baffles and a plurality of septums, each of the septums extending longitudinally between and connected to a respective adjacent pair of the baffles, at least one element of the corrugated ribbon comprising a structural reinforcement;
   the forming comprising feeding a ribbon of material between a first roller and a second roller, corrugating the ribbon of material with the first roller and the second roller to provide the baffles and the septums, and stamping the structural reinforcement into the element with the first roller and the second roller;
bonding the cellular core to a first skin; and
bonding the cellular core to a second skin;
wherein the cellular core is vertically between the first skin and the second skin, and the first skin is configured with a plurality of perforations.

2. The method of claim 1, wherein
the first roller comprises a plurality of first teeth arranged in a first array;
the second roller comprises a plurality of second teeth arranged in a second array; and
the first teeth are configured to mesh with the second teeth to corrugate the ribbon of material.

3. The method of claim 2, wherein
at least one of the first teeth includes a female die portion;
at least one of the second teeth includes a male die portion; and
the stamping comprises mating the male die portion with the female die portion to stamp the structural reinforcement into the element.

4. The method of claim 3, wherein
the at least one of the first teeth further includes a second female die portion;
the at least one of the second teeth further includes a second male die portion; and
the forming further comprises stamping a second structural reinforcement into the element by mating the second male die portion with the second female die portion.

5. The method of claim 3, wherein
the at least one of the first teeth further includes a second male die portion;
the at least one of the second teeth further includes a second female die portion; and
the forming further comprises stamping a second structural reinforcement into the element by mating the second male die portion with the second female die portion.

6. The method of claim 1, further comprising heating at least one of the first roller or the second roller during the corrugating and the stamping.

7. The method of claim 1, wherein the element comprises a base and the structural reinforcement projects out from the base.

8. The method of claim 1, wherein
the element further comprises a base, and the structural reinforcement comprises a rib;
the base extends completely about the rib; and
the rib projects out from the base to a distal end.

9. The method of claim 1, wherein the structural reinforcement comprises a first rib and a second rib that intersects with the first rib.

10. The method of claim 1, wherein the element comprises one of the baffles.

11. The method of claim 1, wherein the element comprises one of the septums.

12. The method of claim 1, wherein
the cellular core further comprises a first wall and a second wall;
the corrugated ribbon is laterally located between and bonded to the first wall and the second wall; and
the structural reinforcement is spaced from the first wall and the second wall.

13. The method of claim 1, wherein the corrugated ribbon comprises thermoplastic polymer material.

14. The method of claim 1, wherein the corrugated ribbon comprises thermoset polymer material.

15. The method of claim 1, wherein the structured panel comprises an acoustic panel configured to attenuate noise.

16. A formation method, comprising:
forming a corrugated ribbon comprising a plurality of baffles and a plurality of septums, each of the septums extending longitudinally between and connected to a respective adjacent pair of the baffles, a first element of the corrugated ribbon comprising a base and a structural reinforcement, the base extending between and to a second element of the corrugated ribbon and a third element of the corrugated ribbon, the structural reinforcement arranged between the second element and the third element, and the structural reinforcement projecting out from the base;
the forming comprising feeding a ribbon of polymer material between a first roller and a second roller, corrugating the ribbon of polymer material with the first roller and the second roller to provide the baffles and the septums, and stamping the structural reinforcement into the first element with the first roller and the second roller;
wherein the first element is configured as one of the baffles or one of the septums.

17. The method of claim 16, wherein
the first roller comprises a plurality of first projections; and
the second roller comprises a plurality of second projections configured to mesh with the second projections to corrugate the ribbon of material.

18. The method of claim 17, wherein
at least one of the first projections includes a female die portion;
at least one of the second projections includes a male die portion configured to mate the female die portion to stamp the structural reinforcement into the first element.

19. A method for forming a structured panel, comprising:
forming a cellular core comprising a corrugated ribbon, a first wall and a second wall, the corrugated ribbon laterally between the first wall and the second wall, the corrugated ribbon including a plurality of baffles and a plurality of porous septums, each of the porous septums longitudinally between a respective adjacent pair of the baffles, a first element of the cellular core configured with a base and a structural reinforcement that comprises a rib, the base circumscribing the rib, and the rib projecting out from the base to a distal end;
the forming comprising feeding a ribbon of polymer material between a first roller and a second roller, and stamping the structural reinforcement into the first element with the first roller and the second roller;
bonding the cellular core to a first skin; and
bonding the cellular core to a second skin;
wherein the cellular core is vertically between the first skin and the second skin, and the first skin is configured with a plurality of perforations.

20. The method of claim 19, wherein the forming further comprises corrugating the ribbon of polymer material with the first roller and the second roller to provide the baffles and the porous septums.

* * * * *